Inventor
Mark Ewald
By: Cox & Moore
Attorneys.

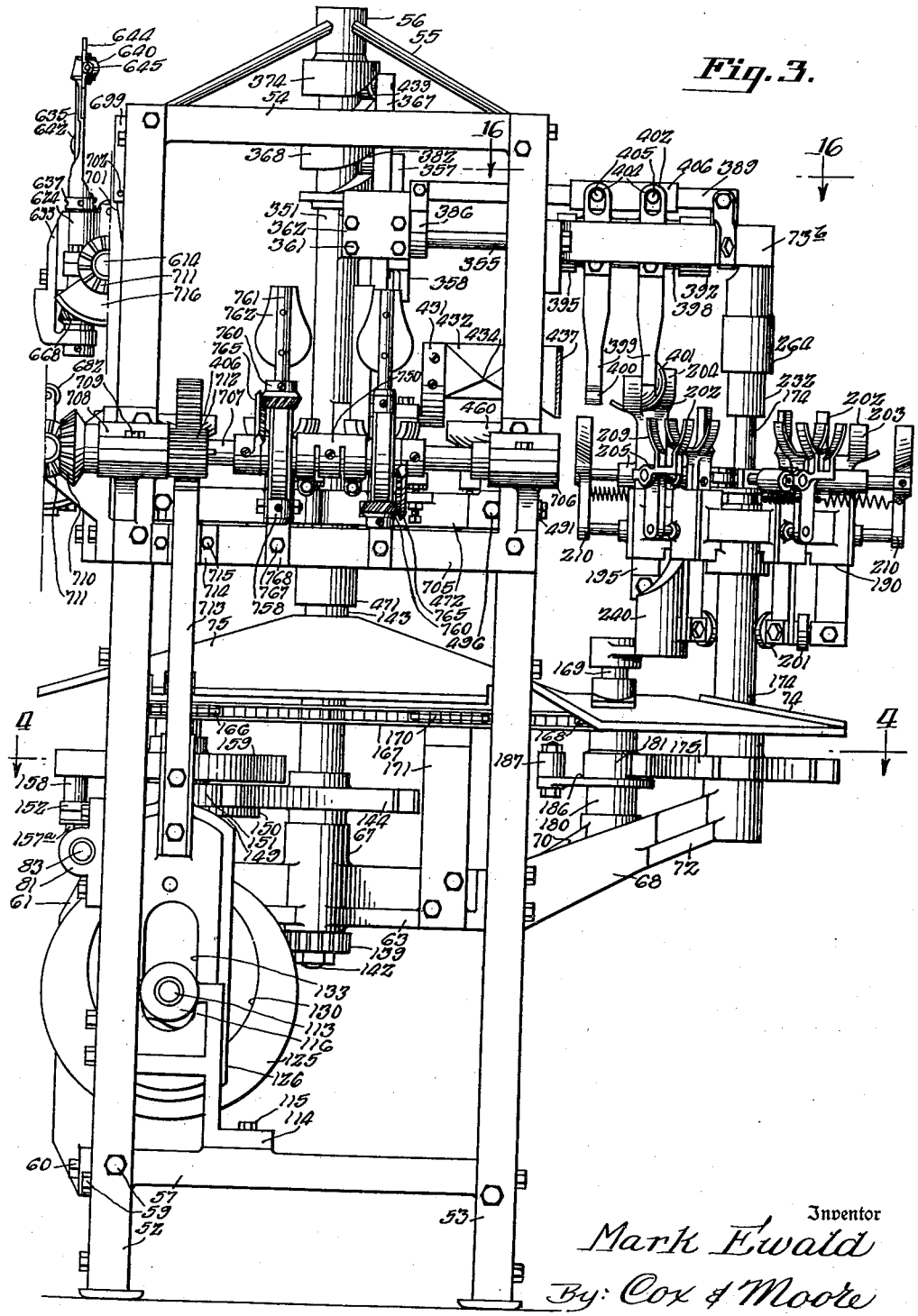

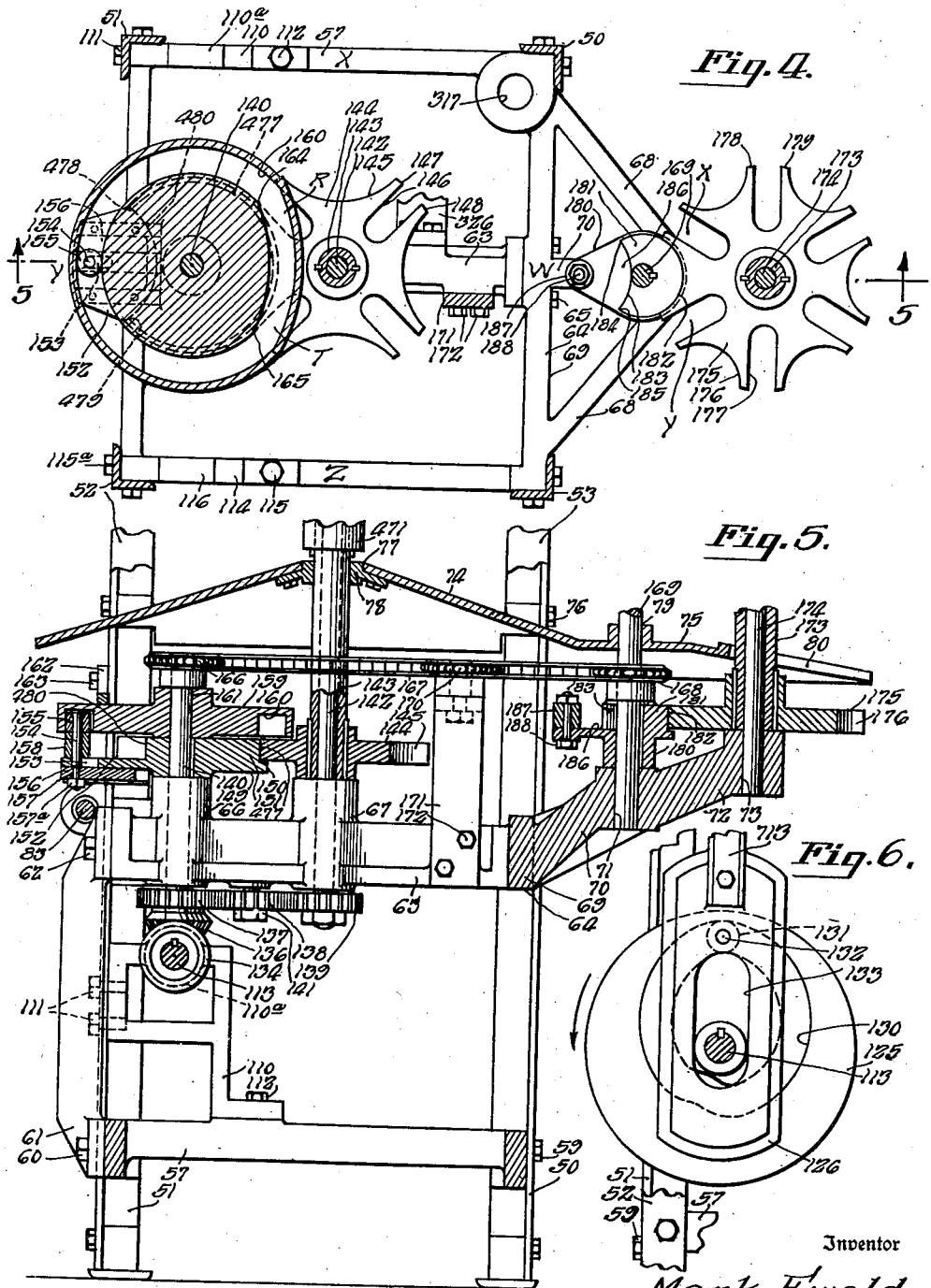

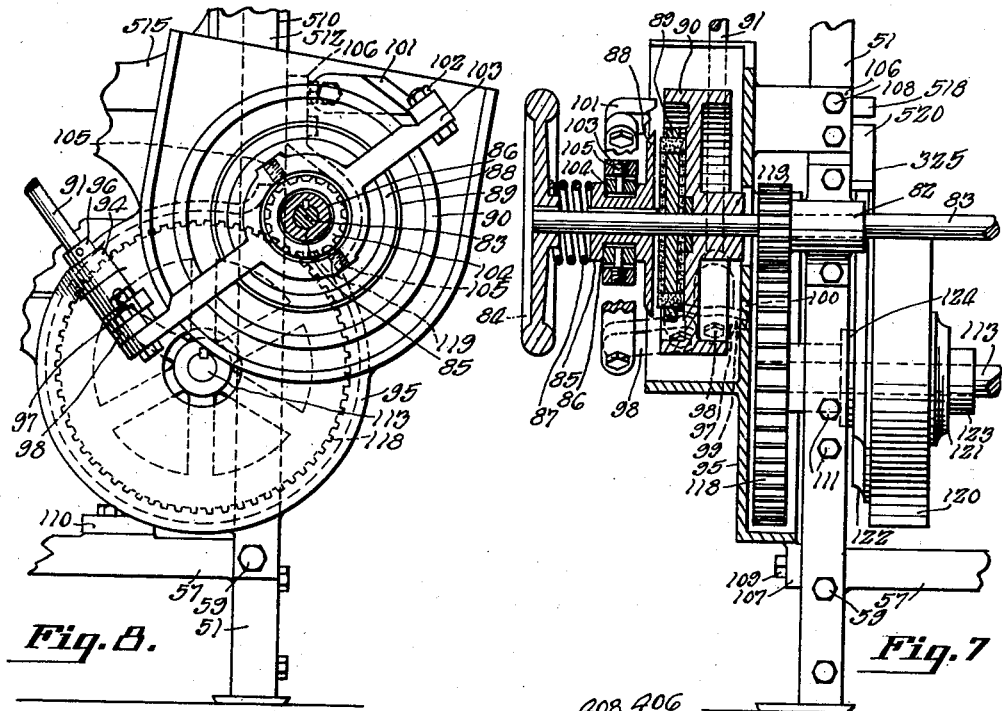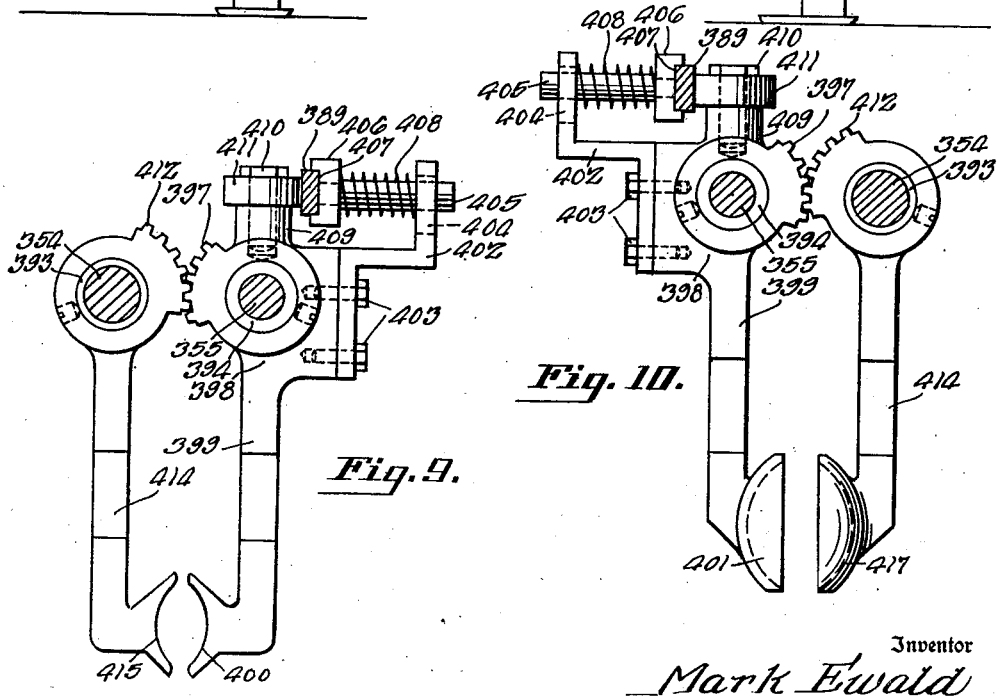

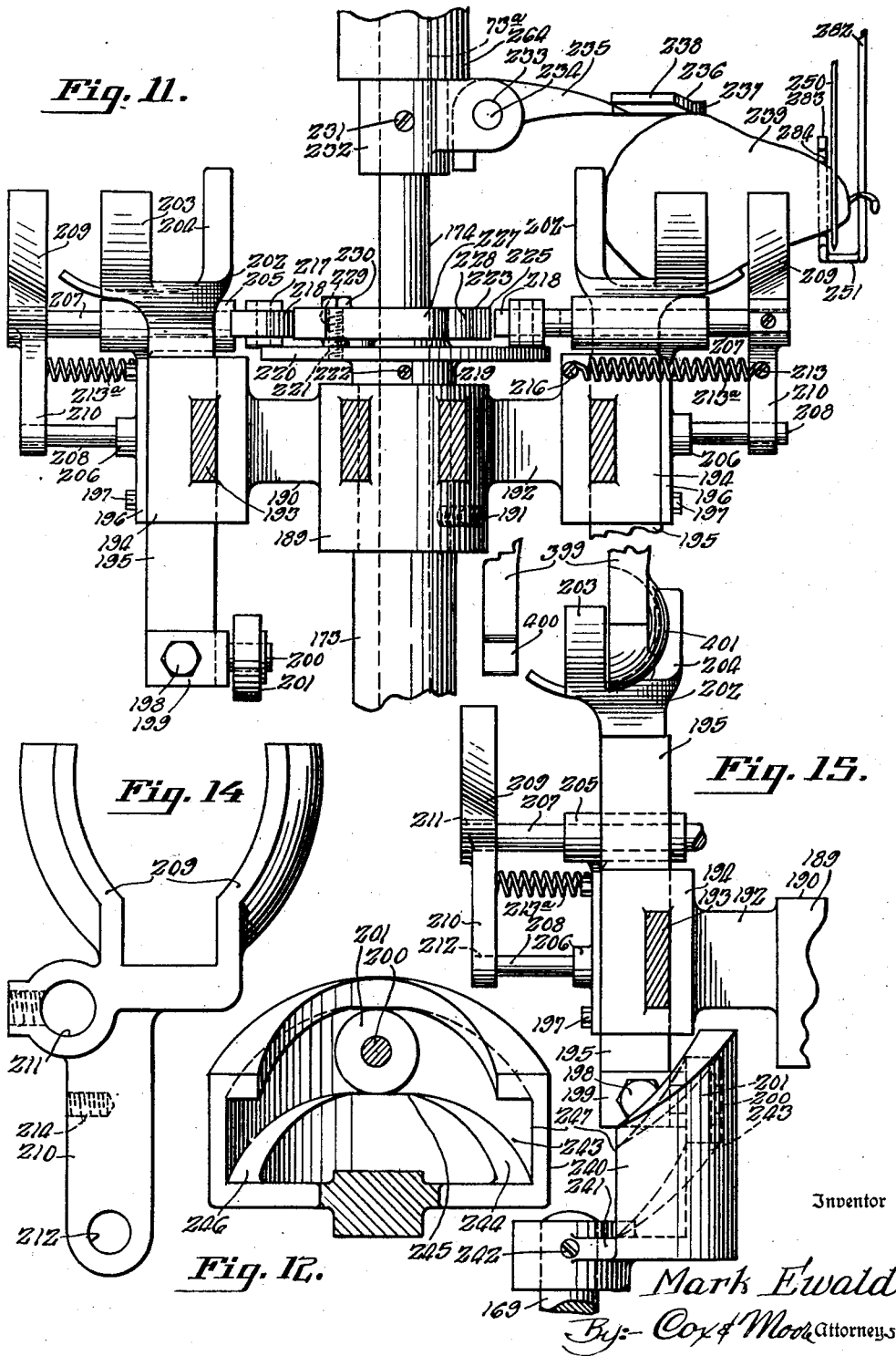

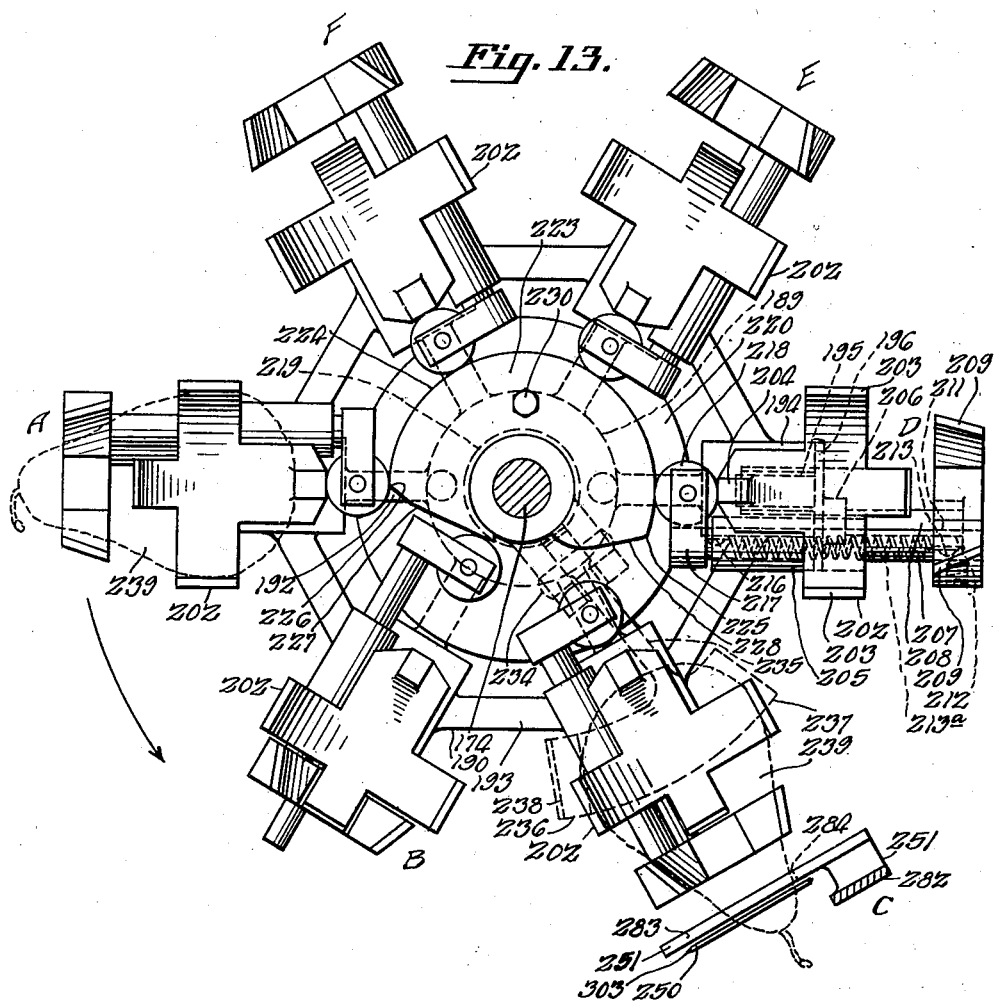

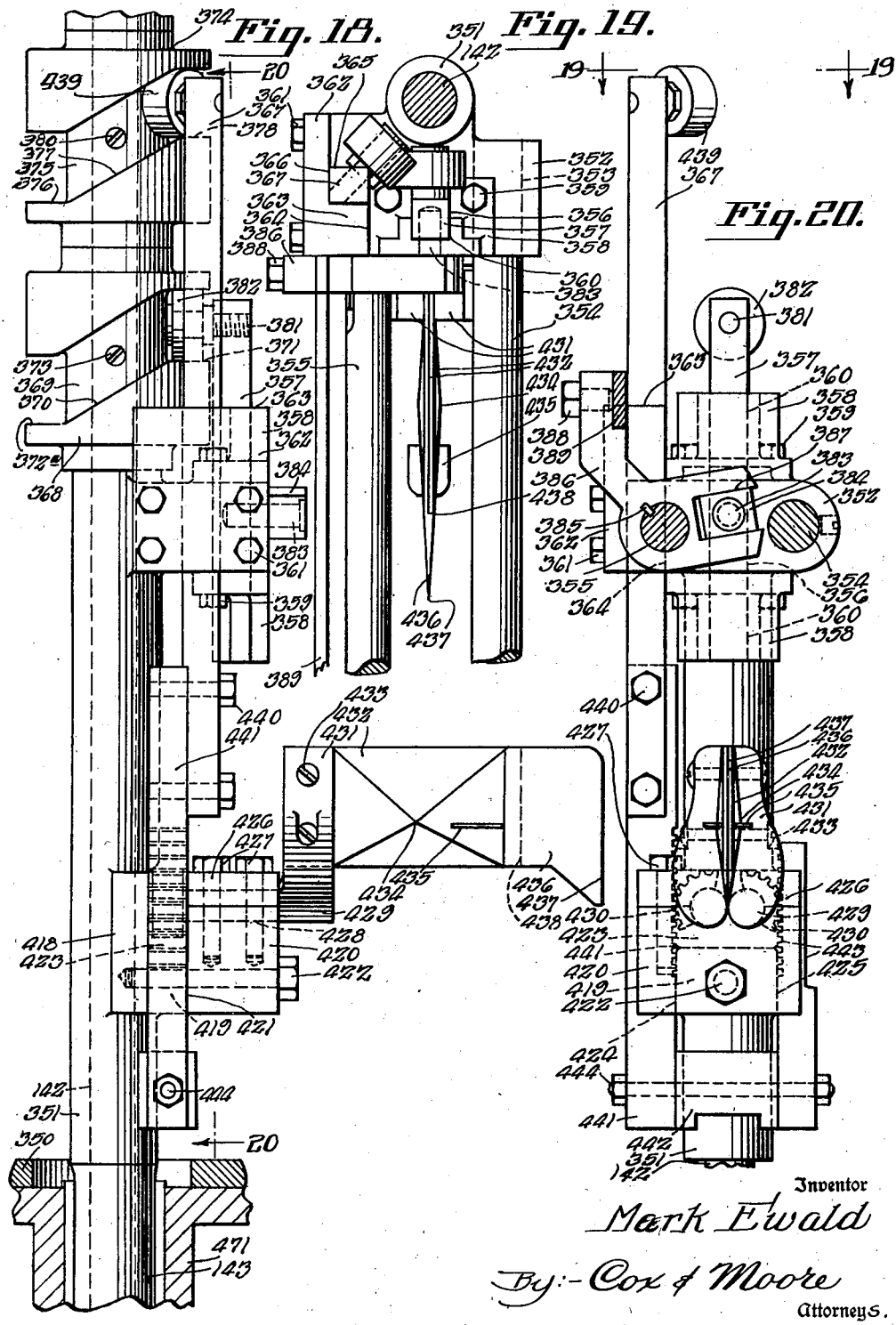

Patented May 20, 1941

2,242,244

UNITED STATES PATENT OFFICE 2,242,244

FRUIT TREATING APPARATUS

Mark Ewald, Olympia, Wash., assignor to Special Equipment Company, Portland, Oreg., a corporation of Oregon Original application October 6, 1932, Serial No. 636,447. Divided and this application April 13, 1938, Serial No. 201,838

48 Claims. (Cl. 146—72)

This invention relates to fruit treating apparatus.

The present application is a division of my pending application Serial No. 636,447, filed October 6, 1932, entitled Fruit treating apparatus, the claims of which latter application are drawn to the combination of a machine embodying a plurality of successive operations to be performed upon a fruit. The subject matter and the claims of the present application are restricted to the transfer mechanism for transporting the fruit from the whole fruit feed-in turret to the splitting mechanism and thence to the spreading mechanism which distributes the severed fruit into the fruit holders of the main fruit holding turret, and also to improved means or mechanism for actuating the transfer jaws, the transfer jaw carriage, and the fruit spreader mechanism; to the fruit spreader mechanism and also to the combined fruit severing and spreading mechanism. As to these latter features, the claims of the present invention are drawn to improved features of construction over that disclosed and claimed in my prior Patent No. 1,989,090, issued January 29, 1935.

Claims drawn to the means for bobbing the whole fruit, such as pears, are contained in my Patent No. 2,161,806, dated June 13, 1939; claims drawn to the construction of the whole fruit feed-in turret and its whole fruit holding members are contained in my pending application Serial No. 621,914, filed July 11, 1932.

Among the objects of the present invention are to provide improved means for actuating the mechanism which deposits the fruit sections or halves into the fruit holders; to provide improved actuating means for operating the fruit splitting and spreading mechanism for depositing the severed halves of fruit into separate fruit holders; to provide improved actuating mechanism for operating the transfer jaw carriage; to provide improved actuating mechanism for opening and closing the transfer jaws; to provide improved construction of transfer jaw mechanism for transferring the whole fruit from one fruit holder, for carrying the same past the fruit severing mechanism and for depositing the fruit sections or halves onto spreader or distributing mechanism; to provide improved actuating means forming a compact, efficiently operating mechanism whereby both the fruit spreaders and the transfer carriage and jaws are operated from a single shaft through compactly arranged cam mechanism; to provide an improved construction of combined fruit splitting mechanism and fruit spreader mechanism; to provide an improved fruit spreader mechanism wherein the same is provided with means for preventing the undue adhesion of the sticky surfaces of the half fruit to the spreader mechanism; to provide improved spreader mechanism with angularly disposed facets to prevent undue suction or adhesion between the faces of the spreader mechanism and the cut faces of the half fruit; to provide an improved construction of spreader mechanism including means adapted to pierce the cut face of the half fruit whereby to prevent lateral movement of the half fruit relatively to the faces of the spreader mechanism prior to the deposit of the half fruit by the spreader mechanism into the half fruit receiving means; to provide an improved facial construction for the spreader plates especially adapted to permit the placing of the fruit flesh piercing means thereon for preventing relative downward movement of the severed half fruit with respect to the spreader mechanism; to provide an improved construction of the transfer carriage mechanism and the fruit transfer jaw mechanism which permits a simultaneous and equal movement of the jaws toward and from each other, which permits the jaws resiliently to grasp the whole fruit or halves of fruit therebetween and adjustably hold them irrespective of the sizes of the successive fruits; to provide an improved construction of transfer jaw which is arranged not only to grasp the fruit to carry it along but which is designed positively to engage the rear end of the fruit to transfer it across the fruit severing mechanism; to provide these and other objects of invention as will be apparent from a perusal of the following specification when taken in connection with the accompanying drawings, wherein:

Referring now to the drawings in detail:

Figs. 1, 2 and 3 are side elevations of the machine;

Fig. 4 is a horizontal section of the machine, taken on line 4—4 of Fig. 3;

Fig. 5 is a fragmentary sectional view of the machine taken on line 5—5 of Fig. 4;

Fig. 6 is a sectional view of the driving mechanism for the device;

Fig. 7 is a fragmentary view of the machine illustrating the clutch mechanism;

Fig. 8 is a side view of the cam and follower mechanism;

Figs. 9 and 10 are sectional views of the jaws of the fruit transfer mechanism;

Fig. 11 is a side view of the whole fruit feed turret mechanism;

Fig. 12 is a perspective view of the cam for elevating the feed cups;

Fig. 13 is a plan view of the feed turret taken on line 13—13 of Fig. 1;

Fig. 14 is a perspective view of fingers complemental to the feed cup;

Fig. 15 is a sectional view of a fragment of the feed turret illustrated in Figs. 11 and 13;

Fig. 18 is a vertical sectional view taken on the line 18—18 of Fig. 2;

Fig. 19 is a plan view taken on the line 19—19 of Fig. 20; and

Fig. 20 is a vertical sectional view taken on the line 20—20 of Fig. 18.

Figure 1:
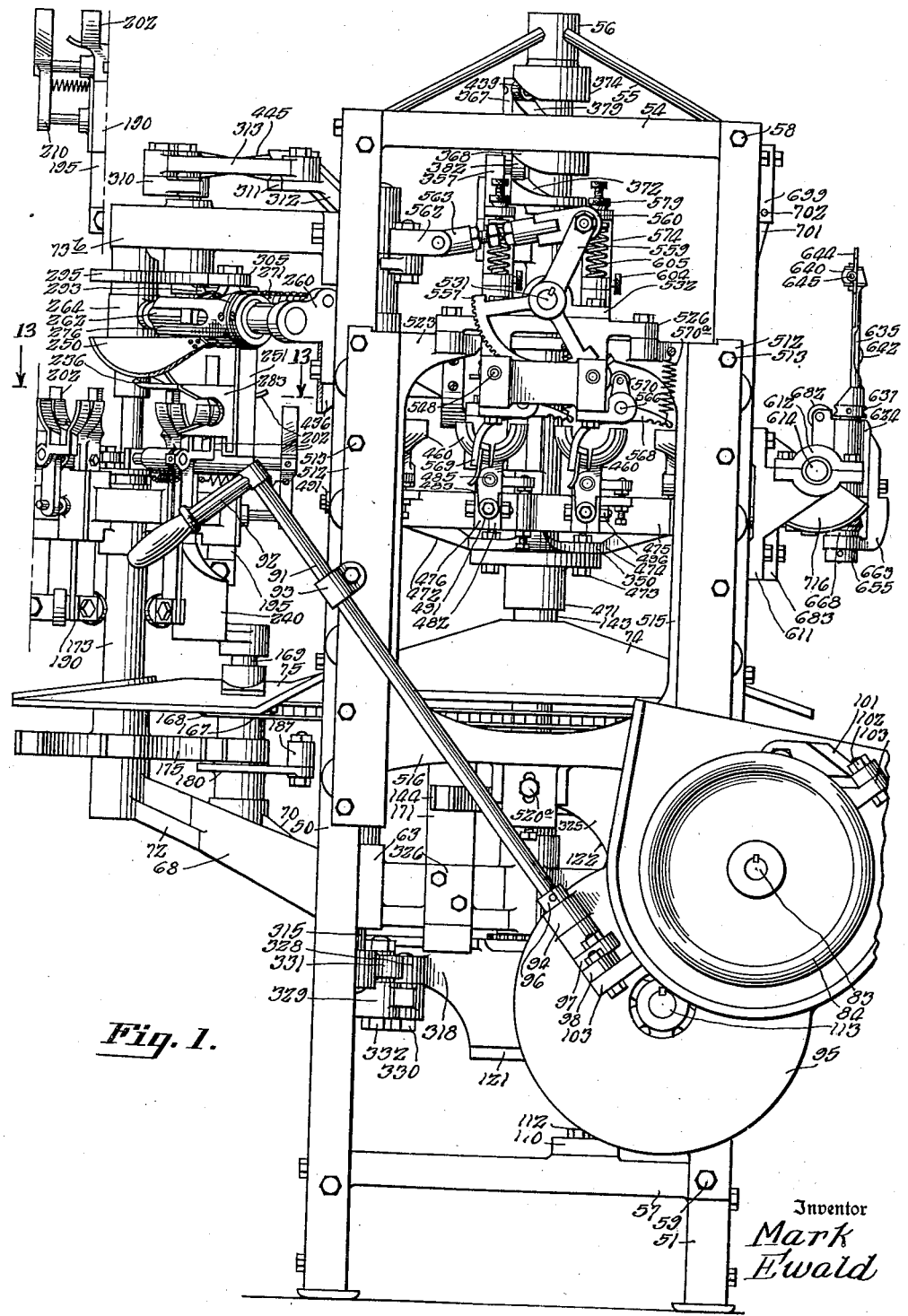
Figure 2:
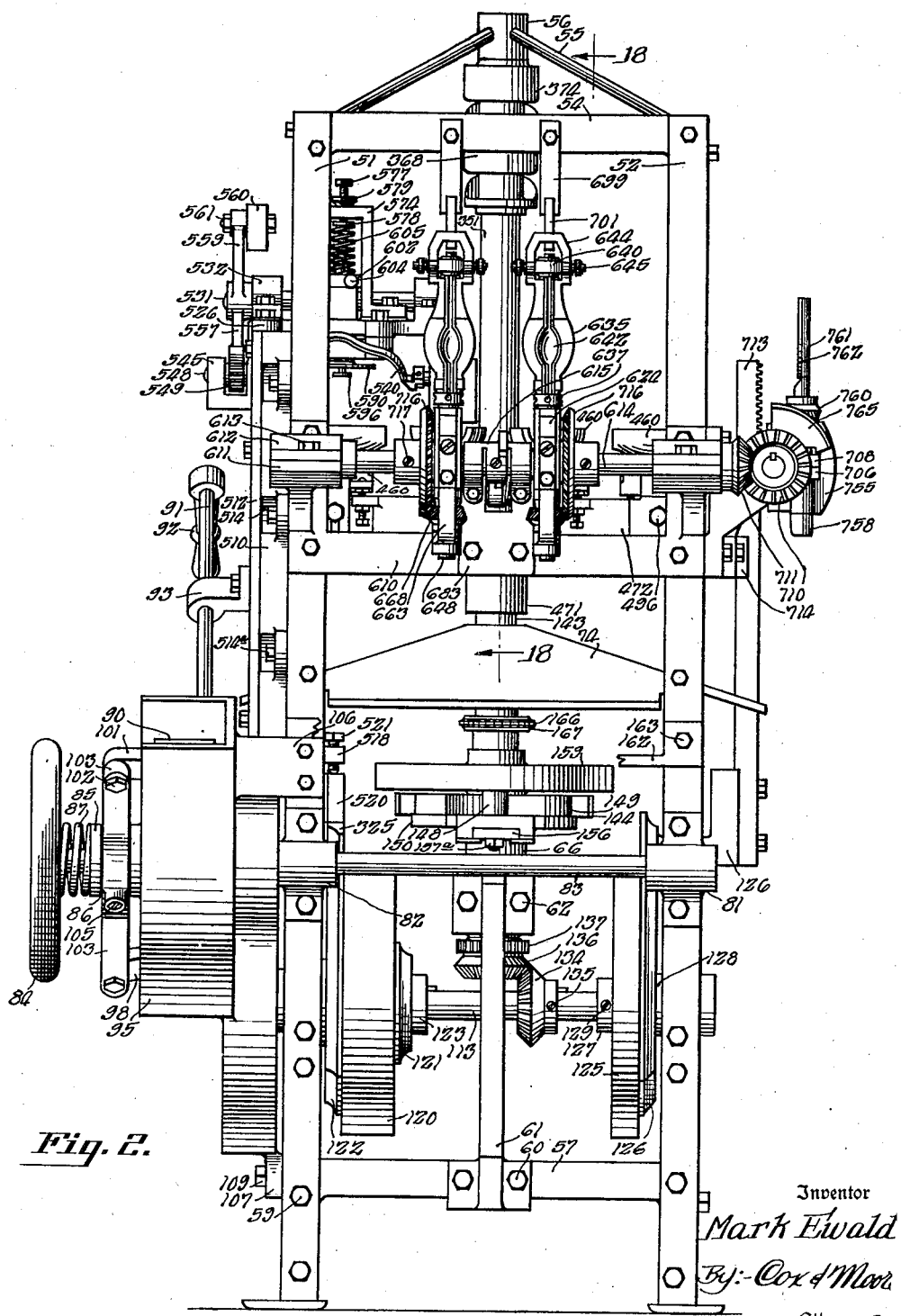

In the illustrations I have shown my invention as applied to a completely automatic type of machine wherein an intermittently operated turret is utilized to carry a plurality of fruit holding members, specifically in the form of fruit cups, in which halves of fruit are deposited and wherein a plurality of operations take place upon the fruit as the turret shifts through a succession of operating stations. The present invention is concerned with the mechanism for severing whole fruits into halves and automatically transferring the halves to mechanism which automatically deposits the several halves into the fruit holding means on the turret. The claims of the present application are concerned with the actuating mechanism for shifting the fruit transfer mechanism past the fruit severing or splitting station, and for causing the opening and closing movement of the fruit transfer jaws, and for causing the shifting movement of the fruit spreading mechanism which deposits the halves into the fruit holders of the turret. In addition the claims are drawn to the peculiar conformation of the side faces of the fruit depositing or spreading mechanism and are directed particularly to the means for preventing adhesion of the cut surfaces of the fruit upon the spreading mechanism during the depositing operation and/or in combination with mechanism for preventing the severed halves from slipping down upon the spreading faces during the spreading movement.

Features disclosed in the present application but not claimed specifically herein are disclosed and claimed in other of my pending applications hereinafter more fully set forth.

It is to be understood that except for restrictions in the claims, the mechanism illustrated and described herein is not by way of limitation but purely by way of illustration.

The frame

The frame for the device is constructed about four upright members 50, 51, 52, and 53. Upright members 50, 51, 52, and 53 are disposed at the four corners of a square and are supported in the selected position at their top by a square frame member 54 which has radiating inwardly and upwardly from the four corners thereof brace rods 55 for the support of a bearing 56 which coincides with the vertical center axis of the frame. Near the bottom of the four angle upright members is a square frame piece 57 which is, in the present instance, a single casting. If desired, the frame piece 57 may comprise four bars joined at their ends. Bolts 58 hold the frame member 54 to the upright angle pieces while bolts 59 serve to hold the lower frame piece 57 in the assembled position.

Attached to the back side of the frame piece 57 by means of bolts 60 is an upright bracket 61 to which is attached by means of bolts 62 a cross member 63. The opposite and front end of the cross member 63 is bolted to the center of a generally triangular frame member 64 by bolts. Bearings 66 and 67 are within the cross member 63, the latter named bearing being axially alined with the bearing 56 at the top of the machine.

Two legs 68 of the frame member 64 extend upwardly and forwardly from opposite ends of the bar 69 extending between the frame upright members 50 and 53 where they enjoin with a third leg 70 which extends from the center of the bar 69. A vertical bearing 71 is formed within the frame piece 64 at the point where the members 68 and 70 are confluent. Forwardly of the bearing 71 and at the end of an arm 72 is a vertical bearing 73.

Above the frame members 63 and 64 is a hood 74 which, in addition to serving as a frame brace member, provides a covering for the parts of the mechanism therebeneath. Four corners of the hood 74 enjoin the four angle upright members 50, 51, 52, and 53, while a portion 75 thereof projects forwardly over the frame piece 64. Bolts 76 provide means for holding the hood 74 in position to the upright frame members. A bearing 77 is provided in the hood 74 coincident with the vertical axis defined by the bearings 67 and 56. A bearing block 78 is attached to the hood 74 in alinement with the bearing 77. In the forwardly projecting portion 75 of the hood 74 is a bearing 79 and a slot 80, the latter extending inwardly of the hood from the most forward edge thereof.

The driving mechanism

Two bearing blocks 81 and 82 provide a common support for a drive shaft 83. The shaft 83 extends to the left of the bearing 82, and has upon the extended end thereof a hand wheel 84. To the right of the hand wheel 84 there is keyed to the shaft 83 a slidable flanged collar 85. Between the flanges of the collar is formed a groove 86. Intermediate the collar 85 and the hand wheel 84 is a compression spring 87 which is seated against the hand wheel 84 for constantly urging the collar 85 to the right.

To the right of a flange 88 upon the collar 85 is a friction disc 89 for commonly engaging a drive pulley 90 and the flange 88 when the collar 85 is allowed to be forced to the right by the compression spring 87. When not engaged by the friction disc 89 the pulley 90 is free to rotate about the shaft 83.

For throwing the clutch arrangement consisting of the friction disc 89 and the flanged collar 85 into engagement with the pulley 90 for driving the shaft 83 is a rod 91 having a handle member 92 on the upper end thereof. A bearing bracket 93 holds the operating rod 91 into position with the upright member 50. At the lower end of the operating rod 91, and which is rotatively held within an apertured ear 94 projecting from a gear guard 95 is a collar 96 to prevent longitudinal displacement of the operating rod. A lever arm 97 is attached to the lower extremity of the operating rod 91 by means of a bolt 98 in a non-rotative manner. One end of the lever 97 is pivotally connected to a link 98 while the opposite end of the lever configures a lug 99 for engaging an aperture 100 in the gear guard 95.

Bolted to the face of the gear guard 95 which partially houses the drive pulley 90 is a bracket 101 to which is pivotally keyed by means of a bolt 102 an arm 103. The lower end of the arm 103 is pivotally connected to the extended end of the link 98 while the center portion of such arm is enlarged and configures a ring into which there is inserted a bushing 104 to be held in place by means of set screws 105.

Lugs 106 and 107 projecting from the upper and lower parts respectively of the gear guard housing 95 are attached to the upright member 51 by means of bolts 108 and 109 for holding the housing in place.

Commonly connected between the leg of the frame member 57 between the upright members 50 and 51 and the leg 51 is a bearing bracket 110. Bolts 111 serve for holding the bearing bracket to the upright member 51 while a bolt 112 holds such member to the frame piece 57. Within the upper body of the bracket 110 is a horizontal bearing 110a for supporting an end of the main cam shaft 113. The opposite end of the cam shaft 113 is supported in a bracket 114 similar to the bracket 110 and which is held in position at the opposite side of the machine by bolts 115 and 115a. A bearing 116 within the upper portion of the bracket 114 serves as a journal for an end of the cam shaft 113. Adjacent to the outer side of the frame member 51 and keyed upon the shaft 113 to rotate therewith is a spur gear 118. Meshing with the spur gear 118 as a driving means therefor is a smaller gear 119 which is keyed to the main drive shaft 83.

A face cam plate 120 is keyed to the main cam shaft 113 for driving two cam follower plates 121 and 122. A more detailed description of the cam follower plates 121 and 122 will be given later together with an explanation of the manner of operation of certain parts of the machine which they drive. Displacement of the follower plate 121 along the shaft 113 and away from the cam 120 is prevented by a collar 123. A collar 124 precludes a similar displacement of the follower plate 122 from the opposite face of the cam 120.

A face cam plate 125 is keyed to the shaft 113 adjacent to the bearing bracket 114. Intermediate the bearing bracket 114 and the cam plate 125 is a cam follower 126 for cooperating with the cam plate 125. For preventing longitudinal movement of the cam 125 and the cam follower 126 are collars 127 and 128. A set screw 129 holds the collar 127 in place. Within the right face of the face cam plate 125 is an irregular eccentric groove 130. A roller bearing 131 operates within the groove 130 and is secured to the cam follower plate 126 by means of a pin 132.

Within the cam follower plate 126 is a vertical slot 133 for the reception of the shaft 113 to adapt the plate for reciprocation as it is propelled by the roller 131 within the groove 130.

A beveled gear 134 is secured to the cam shaft 113 by means of a set screw 135. The beveled gear 134 meshes with a second beveled gear 136. Gears 134 and 136 are shown in a different view in Fig. 5. In the latter named view there will be noted above the pinion 136 a gear 137 which meshes with an idler gear 138 for driving a third gear 139. A shaft 140 journaled within the bearing 66 carries the gears 136 and 137 at its lower end. A stub shaft 141 provides a journal for the idler gear 138, while a shaft 142 commonly journaled in the bearings 67, 78, and 56 carries the gear 139.

Resting upon the top of the bearing 67 is a sleeve 143 which is free to turn independently of the shaft 142 and has keyed thereto for common rotation a star cam 144. About the periphery of the cam 144 are alternately arranged arcuate sections 145 and inwardly extending slots 146. At the ends of the slots 146 and the arcuate sections 145 are points 147 and 148.

Above the bearing 66 to rest thereon and keyed to the shaft 140 is a Geneva cam plate 149. The plate 149 is circular and is disposed within a horizontal plane common to that of the body of the star cam 144. A narrow flange 150 circumscribes the lower edge of the main body 151 of the cam to extend therefrom as a section 152. Within the cam section 152 is a slot 153 with its major dimensions arranged radially of the vertical axis within the shaft 140. The slot 153 is for slidably carrying a pin 154 which carries a roller bearing 155 upon its upper end. A plate 156 is free to slide along the lower face of the cam section 152 and has an aperture 157 for receiving the lower end of the stem 154 which is threaded for the reception of a nut 157a for holding the plate 156 in place. Above the cam section 152 is a roller sleeve 158 for measurably spacing therefrom the roller bearing 155 which coacts with the star cam 144 in the slot between the joints 147 and 148 for imparting motion to the cam.

Above the Geneva cam plate 149 is a stationary cam plate 159 which presents a groove 160 in its lower face and which groove is of substantially the same width as is the roller 155 and which is for propelling the roller 155 axially of the Geneva cam 149 as the latter is rotated with the shaft 140. A bearing 161 within the cam plate 159 provides for free rotative movement of the shaft 140 therein while a bar 162 held between the frame members 51 and 52 by means of bolts 163 prevents rotation of the plate 159.

It will be noted that the contour taken by the groove 160 for the greatest portion thereof is of a radius generated about the axis within the shaft 140. Between the points 164 and 165, however, the groove 160 is generated about a point more distant therefrom than the shaft 140.

Upon the upper end of the shaft 140 is a sprocket wheel 166 for driving a chain 167. The opposite and forward end of the chain 167 drives a sprocket 168 which is upon a vertical shaft 169 cojournaled within the bearings 71 and 79. Intermediate the two sprockets 166 and 168 is an idler sprocket 170 to prevent flapping of the chain 167 due to vibration of the machine. The sprocket wheel 170 is supported upon a bracket 171 which is secured to the cross frame member 63 by means of bolts 172.

I have provided a Geneva cam arrangement for driving a sleeve 173 intermittently about a rod 174 which is held stationarily within the bearing 73 and a bearing 73a, thereabove in a trapezoidal frame piece 73b. Keyed to the sleeve 173 is a star cam 175 having arcuate sections 176 and grooves 177 arranged alternately about its periphery. There are six slots and six grooves in the present form of the invention but this number is, of course, not inflexible. At the side of each slot 177 are points 178 and 179.

Keyed to the shaft 169 is a Geneva cam plate 180 having a raised portion 181 with an arcuate section 182 of the same radius as the arcuate sections 176 of the star cam 175, and a concave arcuate section 183. The sections 182 and 183 enjoin at the points 184 and 185. Supported at the point of the lower projecting portion 186 of the cam 180 is a roller bearing 187. A stub shaft 188 provides a journal for said roller bearing.

The feed turret

The lower end of the sleeve 173 rests rotatively upon the top of the bearing 73. It will be noted that at the top of the sleeve 173 there is a hub 189 of a feed turret 190. A set screw 191 secures the hub 189 and the sleeve 173 together for common rotation. Radiating from the hub 189 are spokes 192 in support of a peripheral rim 193. The configuration taken by the rim 193 is hexagonal, there being a bearing 194 at each of the vertexes of the rim. The bearings 194 are rectangular in cross section and are open at the outermost side so that stems 195 of the same rectangular cross section may be inserted therein in a manner to adapt them for vertical reciprocation. After the stems 195 are inserted into the bearings 194, plates 196 may be placed over the open sides of the bearings to be there held by means of bolts 197.

The lower end of each of the stems 195 is apertured for the reception of a bolt 198 so that straps 199 having journals 200 for roller bearings 201 may be attached thereto. The upper body of the stems 195 configure a feed cup 202 having side pieces 203 and a back piece 204.

Within the sides of the bearings 194 are horizontal bearings 205 extending radially of the turret 190. In a centrally drilled and tapped boss 206 is anchored a stem 208 to project slidingly into an aperture 212 formed within the lower body of a stock 210 from which fingers 209 extend upwardly. A second stem 207 is set within an aperture 211 at the upper end of the stock 210 to extend slidingly into the bearing 205. A contraction spring 213a which is attached to each of the pairs of fingers 209 by means of a set screw 213 set within the stock 210 at a threaded recess 214 and having the opposite end anchored at 216 within a side of its respective bearing 194 constantly urges the fingers 209 toward the fruit cup 202.

There will be noted upon the inwardly disposed end of each of the stems 207 a horizontally placed arm 217 which is bifurcated to hold a roller bearing 218 in a manner to rotate about a vertical axis. Immediately above the hub 189 of the turret 190 is a collar 219 having a flange 220 with a threaded aperture 221 and held in a selected fixed radial position relative to the shaft 174 by means of a set screw 222. Above the flange 220 is a cam plate 223 having an arcuate section 224 with terminals 225 and 226, and other cam sections 227 and 228. An aperture 229 in the cam plate 223 coincides with the threaded aperture 221 in the flange 220 so that a bolt 230 may commonly engage the flange 220 and the cam plate 223 for holding the two members in fixed assembly. Shifting of the position of the cam plate 223 about the shaft 174 is accomplished by loosening the set screw 222 and retightening said set screw after a selected position is attained.

Above the cam 223 and fixed to the shaft 174 by means of a set screw 231 is a collar 232 having a pair of apertures 233 for the common reception of a pintle member 234 which carries an arm 235. Projecting downwardly from the arm 235 is a lug 236 to press against the collar 232 and prevent downward displacement of the arm 235 beyond a desired position. Depending from the extended end of the arm 235 is a plate 236 having a horizontally disposed section 237 and an upwardly turned section 238. The arm 235 is of such a length as to place the plate 236 above the path of a fruit 239 as it is carried about the shaft 174 by a fruit cup 202.

I provide at the top of the shaft 169 a curved cam plate 240. The plate 240 is offset from a shank 241 which engages the upper extremity of the shaft 169 to be held in a selected radial position thereto by means of a set screw 242. Within the concave surface of the cam plate 240 there is formed a groove 243 having an entrance 247, an inclined section 244, a flat elevated section 245 and a declined section 246. The groove 243 is of a width to accommodate the roller bearings 201.

Power for driving the feed turret 190 is received from the pulley 90 and the main drive shaft 83 which may be driven from any convenient source of power to rotate in an anti-clockwise direction as viewed from the right side of the machine. When it is desired to connect the shaft 83 to the pulley 90 the operating shaft 91 is given a turn in a clockwise direction with reference from its handle bearing end to remove the lug 99 from the side of the aperture 100 against which it has been pressed by the effort of the spring 87, and to displace the adjoined ends of the link 98 and the lever 97 downwardly so that the spring 87 may urge the flanged collar 85 to the right, to compress the friction disc 89 therebetween and the adjacent face of the pulley 90. Thereafter the grooved collar 85 is caused to rotate with the pulley 90 while the bushing 104 slides within the groove 86. When the drive shaft 83 is so set in motion the gear 119 turns the gear 118 in a clockwise direction as viewed from the right side of the machine whereby the pinion 136 and the gear 137, as viewed from above, are rotated in a clockwise direction through the agency of the beveled gear 134. The shaft 140 and the sprocket wheel 166 are also rotated in a clockwise direction whereby the sprocket wheel 168 and the shaft 169 are caused to rotate in a like direction.

When the cam 180 and the cam plate 175 are in the position shown in Fig. 4, the upper body 181 of the cam 180 is within the arcuate section 176 of the cam 175 to prevent the latter named member from rotating. Continued clockwise movement of the cam 180 carries the point 184 to a position on a center line between the shafts 169 and 174. With the upper body 181 stationed in this position said body will no longer obstruct turning of the cam 175 for the cam point 178 which is then opposite to a central position within the arcuate face 183 may then be moved toward that face. Simultaneously with the positioning of the point 184 upon the center line between the shafts 169 and 174 the roller bearing 187 makes entrance into the groove at position "X" which registers with the moving path thereof and to press along the side of the groove to rotate the cam 175 in a counter-clockwise direction. When the groove at "X" is so engaged it is moved to position "Y." Incident to the slot 177 arriving at position "Y" the roller bearing 187 makes an exit therefrom concurrently with the entrance of the point 185 into the succeeding arcuate section 176 at the point 178. Thus it has been shown that the cam plate 175 is rotated through one-sixth of a revolution each time that the cam 180 makes a complete revolution.

Movement of the cam 175 is had only while the roller bearing 187 is within a groove 177, the cam 175 being held stationary while the raised portion 181 is within an arcuate section 176. It is evident that the sleeve 173 and the feed turret 190 which are driven by the cam 175 will be caused to rotate intermittently, the stationary period of the turret being for a greater period of time than the rotary period.

Stations designated by the letters A, B, C, D, E, and F will be noted. The arcuate section 224 of the cam 223 is of such an extent and is in such a radial position relative to the shaft 174 that the fruit cups which are at the stations D, E, F, and A, will have their respective roller bearings 218 in contact with such arcuate section so that the stems 207 will be displaced outwardly of the feed turret against the urge of the contraction springs 213 and so that the fingers 209 will be displaced from the cup side pieces 203. While the fingers 209 are so displaced from the fruit cups a fruit may lie loosely within the fruit cups. Therefore, at the stations E, F, and A, a fruit may be easily placed within the fruit cups with the stem bearing end extending outwardly from the turret.

The Geneva cam movement for the turret is designed so that each movement given to the turret will be one-sixth of a revolution to remove the feed cups from one station to the next where it will be permitted to remain until a following movement is imparted to the feed turret.

The fruit 239 which has been placed within the fruit cup at station A when transferred from station A to station B by a movement of the fruit turret is pressed by the fingers 209 because of the urge of the spring 213 when the roller bearing 218 passes along the camming surface 227 to permit the fingers to be displaced inwardly of the feed turret. Incident to the next intermittent movement of the feed turret and the transferring of the fruit from station B to station C, the fingers are allowed to remain in their inwardly displaced position against the fruit and the fruit is carried against the upwardly displaced portion 238 of the plate 236 to displace said plate upwardly as it slides upon the fruit. When the fruit has reached station C it will be beneath the flat section 237 of the plate 236. It is at station C that the stem bearing end is bobbed from the fruit by means of a blade 250. Associated with the blade 250 is a holder member 251 for engaging the fruit incident to the bobbing operation to assist in holding the fruit within the feed cup and thereby preventing it from being displaced from the cup when the blade 250 is passed therethrough. It is the function of the weight 236 to assist the fingers 209 and the holding member 251 to retain the fruit stationarily within the cup during the bobbing operation. Because of the fact that the fruit is to be engaged by other apparatus at the following station it is important that the fruit be not skewed from a selected seated position within the feed cup by the bobbing mechanism.

Concurrently with the advancement of the feed cup 202 from station C to station D subsequent to the bobbing operation, the fruit is passed from beneath the weight 236 and the roller bearing 218 is passed along the camming surface 228 to displace the fingers 209 away from the fruit cup so that the fruit will be lying freely within the cup when station D is reached. While the fruit is lying freely within the cup at station D, it is possible for other apparatus, later to be explained, for abducting the fruit inwardly of the machine, to easily engage it.

After the fruit has been carried from the fruit cup at station D, the next intermittent movement of the turret carries it to station E where a different fruit may be placed therein and the cycle repeated.

The cam 240 which is mounted upon the shaft 169 is rotated uniformly in a clockwise direction as viewed from above. The radial position of the cam 240 with reference to the shaft 169 is such that the entrance 247 to the groove 243 will be presented to a roller 201 when the fruit cup with which it is associated is advanced to station D. While the roller 201 is held stationary at station D by the Geneva cam mechanism hereinabove described, the cam 240 continues to rotate and elevates the fruit cup while the roller 201 is traversed by the camming surface 244. The fruit cup is held in the elevated position for a short period of time while the flat camming surface 245 is passed beneath the roller and thereafter the feed cup and roller 201 are depressed while the camming surface 246 traverses the roller. It is while the feed cup is held in the elevated position by the flat camming surface 245 that the splitting carriage, later to be described, engages the fruit for abducting it from the feed cup.

By reference to Fig. 13 it will be seen that when the pears are inserted into the feed-in turret or whole fruit turret at station A, an intermittent movement of the turret will carry them in a counter-clockwise direction to station C, where the pears are bobbed. The details of construction and operation of the bobbing mechanism and of its cooperation with the whole fruit holding members, shown in Fig. 13, are claimed in my Patent No. 2,161,806, dated June 13, 1939, and also certain features of the bobbing mechanism in combination with the holding jaws and the manner in which the holding jaws cooperate with the transfer mechanism are claimed in my copending application Serial No. 621,914, filed July 11, 1932. The bobbing mechanism of Patent No. 2,161,806, dated June 13, 1939, is shown in Fig. 1.

After the bobbing operation has been completed, the feed turret 193 carrying the bobbed pear will move to station D, see Fig. 13. This station D is directly in line not only with mechanism for severing the whole fruit but is also in direct registration with transfer mechanism and spreader mechanism constructed and arranged automatically to remove the whole fruit from the fruit holding means of the feed-in turret 193, to convey the fruit to the severing or splitting means, and thence onto the spreading means or depositing the two sections or halves of the severed fruit into fruit holders carried by the main turret of the machine, which main fruit holders will thereafter carry the split halves or sections in intermittent movement to one or more operating stations.

*Transfer mechanism and fruit severing mechanism*

Above a hub 350 of a fruit turret there is shown a sleeve 351 upon the central vertical shaft 142, see Fig. 18. At the upper end of the sleeve 351 and integral thereto is a boss 352 having a bearing 353 therein, Figs. 18 to 20, for the support of a rod 354. A recess, not shown, in the opposite side of the boss 352 serves as a bearing in which an end of a rod 355 is supported. Rods 354 and 355 project forwardly to be supported in the front side of the frame member 73b, in the manner shown in Fig. 16.

A vertical groove 356 within the front face of the block 352 serves as a channel in which a rod 357 may be guided for vertical reciprocation. Above and below the block 352 are brackets 358 which are held in place to the block by bolts 359. A groove 360 in each of the brackets 358 coacts with the groove 356 in the block or boss 352 to form a bearing for the reciprocal rod 357.

Bolted to the left side of the block 352 by means of bolts 361 is a plate 362 having a section 363 projecting to the right against a face 364 provided in the block 352. A notch 365 within the body of the block 352 coacts with the notch formed between the projection 363 and the main body of the plate 362 to form a bearing 366 in which a rod 367 may be confined for vertical reciprocation.

Immediately above the sleeve 351 is a circular cam 368 having a groove 369 with an inclined camming section 370, an elevated section 371, and a declining camming section 372. Between the two sections 370 and 372 at their lower ends is a camming section 372a. A set screw 373 secures the cam 368 to the shaft 142 for common rotation of the two members.

Above the cam 368 is a cam somewhat similar which is designated by the number 374. A groove 375 circumscribes the cam 374. The lower side of the groove 375 embodies a camming surface 376 of a low elevation, an inclined surface 377 leading from the section 376 to a section 378 of a higher elevation and a section 379 leading from the section 378 to the section 376. The cam 374 is also caused to rotate in a clockwise direction with the shaft 142 because of a set screw 380.

A stub shaft 381 projecting from the upper extremity of the rod 357 supports a roller bearing 382 within the groove 369 so that the cam 368 may reciprocate the roller 382 and the rod 357 vertically when the shaft 142 is rotated. Projecting forwardly from the reciprocal stem 357 is a pin 383 for rotatively carrying a rectangular block 384. Pin 383 projects outwardly of the groove 356 within the block 352 in a manner to be free for reciprocation between the limits established at the upper and lower faces of said block where the brackets 358 are anchored.

Connected to the rod 355 by means of a key 385 is a lever 386, Fig. 20. One end of the lever 386 contains a clevis 387 for carrying the block 384 in a manner that the block may slide back and forth therein. The opposite end of the lever 386 has secured thereto by a bolt 388 an end of a horizontal roller bar 389. Upon the opposite end of the rod 355 is connected an arm 390, Fig. 16, to the extended end of which is held the opposite end of the roller or slider bar 389 by means of a bolt 391, see Fig. 16.

Slidably mounted upon the two rods 354 and 355 is a splitting carriage 392. Figs. 3, 9, 10, 19, and 20 should be referred to conjointly in the description immediately following of the parts comprising the splitting carriage 392. Slidably mounted in opposed relationship on the two rods 354 and 355 are sleeves 393 and 394. Carriage end pieces 395 and 396 are suitably apertured to be telescoped onto opposite ends of the sleeves 393 and 394 to hold the parts in a fixed assembly which is free to slide longitudinally of the rods 354 and 355.

Upon the sleeve 394 and intermediate the end pieces 395 and 396 are segmental gears 397 having integral collars 398 which entirely fill the space between the two end pieces. Depending downwardly from the two collars 398 are clamp arms 399. The end of the rearmost clamping arm 399 terminates in a forked member 400 while the foremost arm terminates in a half scoop 401 or half cup shaped member adapted to cooperate with a similarly formed member 417 hereinafter referred to whereby to push the fruit past the severing means 437. To the left side of the collars 398 are attached brackets 402 by means of bolts 403. In the upper parts of the brackets 402 are apertures 404 for loosely containing ends of short rods 405. Commonly carried upon the opposite ends of the rods 405 is a shoe 406 having a groove 407 which fits about the slider bar 389 in a manner adapting said shoe to slide along the bar. Springs 408 press against the brackets 402 and the back of the shoe 406 to hold the latter named member in place against the slider bar and whereby also to permit the jaws to yield relatively when holding variant sizes of fruit. In the upper sides of the collars 398 are apertured bosses 409 into which bolts 410 are anchored for holding roller bearings 411 which are adapted for rolling along the side of the slider bar 389 opposite to the shoe 406.

About the sleeve 393 for meshing with the gears 397 are gears 412 having collars similar to the collars 398. Depending from the backmost collar 413 is a clamp member 414 having a forked end 415 opposite to and complemental to the forked end 400 of the clamp member 399. From the collar 413 of the foremost gear 412 there depends a clamp arm 414 having a scoop-like end 417 opposite to and for coacting with the scoop-like end 401 of the clamp arm 399. The clamp arms 399 and 414 cooperate in a manner for lifting a fruit from a feed cup at station D in a manner presently to be described.

Near the lower end of the sleeve 351 is a plate-like section 418 having a section 419 projecting forwardly from a vertical center central portion. The section 419 is not as high as the plate 418 nor is it as wide so that when a bearing block 420 is carried against the face 421 of the forwardly projecting section 419 to be there held by the bolt 422, an entrenchment or slideway 423 will be formed between the plate 418 and the block 420 and above the projecting section 419. Since the width of the block 420 is coextensive with the width of the plate 418, there will be vertical grooves 424 and 425 at the two lateral sides of the forwardly projecting sections 419. A pillow block 426 is held to the top of the bearing block 420 by means of bolts 427 to form bearings 428 into which stems 429 may be held for rotation. Upon the back ends of the stems 429 are pinions 430 for operating within the entrenchment 423.

Wings or halved fruit spreaders 431 are turned at right angles to the stems 429 for the support of leaflike members 432. Screws 433 provide attaching means between the leaf members 432 and the wings 431.

In order to prevent a vacuum or extreme adhesion between the severed fruit sections and the outer faces of the spreader wings 431, I provide these faces with means for not only preventing this vacuum but I also provide the means so that it extends substantially over the entire outer surfaces of these spreader members. In addition I prefer to provide the spreaders with means for preventing the cut sections of the fruit from being inadvertently dislodged from the spreaders when the spreaders are in vertical position. This fin member hereinafter referred to is preferably placed in such a position upon the outer faces of the spreaders that it will pierce the core section or central elongated threaded section or fibrous section of the half pear. The means for breaking the vacuum comprises preferably four triangular facets in the opposite faces of the leaf-like members 432 terminating in a point 434 which is raised slightly from the body of the leaves. Set within each leaf member in a horizontal plane forwardly of the point 434 is a fin member 435. A blade 436 having a vertical sharpened edge 437 projects forwardly from the left member 432, there being a notch 438 where the blade 436 joins said left member so that the forward edge of the right member 432 may set therein in a manner to be flush with the right face of the blade. Thus when the two leaf members 432 are together, a cuneiform configuration is established between the edge 437 of the blade and the two points 434 upon the leaf members 432.

At the top of the reciprocal bar 367 is a roller 439 which rides within the groove 375 of the circular cam 374. Attached to the lower end of the rod 367 by means of bolts 440 is a rack 441 which meshes with the pinion 430 which is at the right, Fig. 18. A block 442 measurably spaces a second rack 443 from the rack 441 and a bolt 444 holds the three members in assembly. The gear 430 to the right is rotated by the rack 443 in a direction depending upon whether the rod 367 is being raised or lowered.

Figure 16:
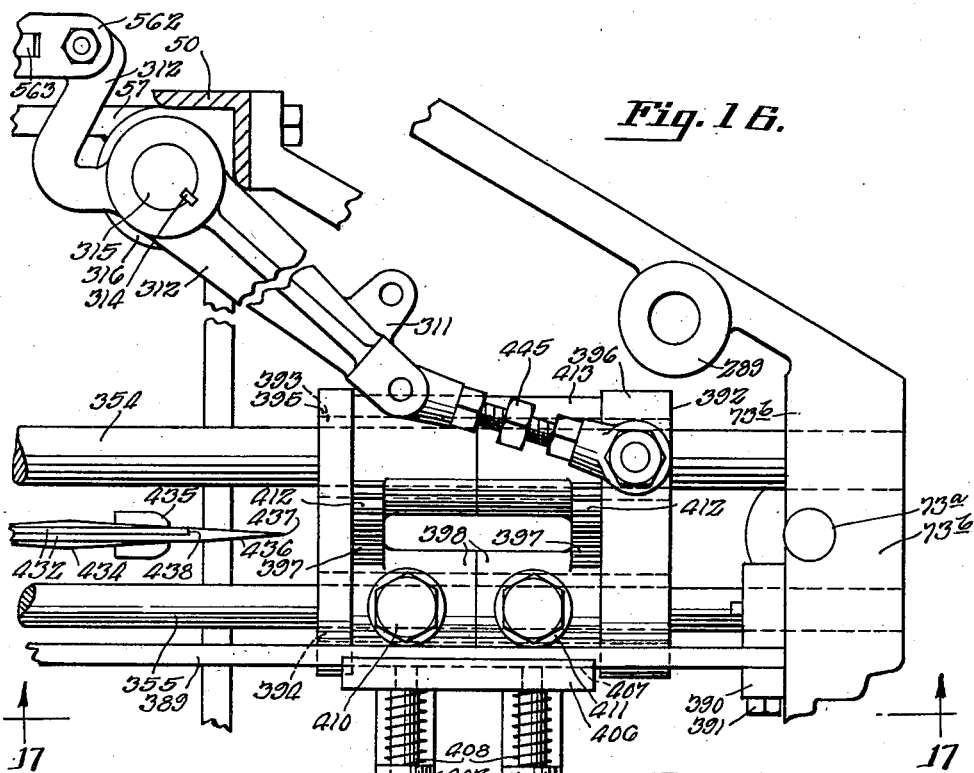
Fig. 16 is a plan sectional view taken on the line 16—16 of Fig. 3.
Figure 17:
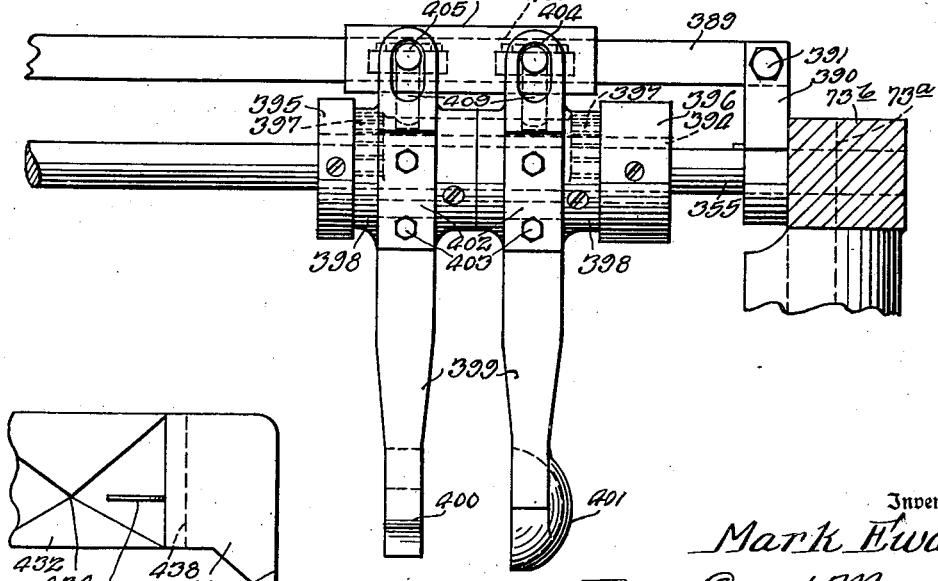
Fig. 17 is a sectional view of the splitting carriage taken along the line 17—17 of Fig. 16.

In Fig. 16 there will be noted an adjustable link 445 as a means for operatively connecting the end of the lever 312 to the splitting carriage 392 at the end piece 396. When the lever arm 312 is oscillated the splitting or transfer carriage 392 is moved forwardly and backwardly along the rods 354 and 355 in a selected sequence with the operation of the leaf members 432 and of the feed turret.

*Operation*

When a feed cup is moved to station D to hold a fruit loosely therein, the lever 312 is given a counter-clockwise movement by the shaft 315 to shift the splitting carriage 392 forwardly. While the splitting carriage 392 is being moved forwardly the cam 368 is rotated in such a position as to hold the roller bearing 382 at the lowermost of its reciprocal positions. When the roller bearing 382 and the rod 357 are forced downwardly the block 384 which pivots about the post 383 slides within the groove 387 pursuant to rotating the lever arm 386 in a clockwise direction with reference from the front of the machine. Incidentally the rod 355 rotates along with the lever 386 to rotate the lever 390 in the same direction. It is in this manner that the slider bar 389 is moved clockwise about the axis within the rod 355 to press against the rollers 411 to pivot the collars 398, the gears 397 and the gears 412 which mesh with the first named gears to spread the clamp members 393 and 414. With the clamping members so held apart, there is no interference with their forward movement as they are slid into a position about the feed cup at station D. After the clamping members 414 and 399 are positioned about the feed cup, the cam 368 continues to rotate in a clockwise direction as viewed from above to elevate the roller 382 along the camming surface 372 whereby the lever 386, the rod 355 and the lever 390 are rotated in a counter-clockwise direction to close the clamping members about the fruit. The forklike jaws 400 and 415 clamp the fruit slightly to the rear of the cup members 203 while the scoop-like jaws 401 and 417 close about the heel of the fruit which is between the side cup members 203 and the cup member 204, see Fig. 3. After the fruit has been so engaged by the clamping members of the splitting carriage, the roller 201 of the feed cup is lowered by the cam 240 to leave the fruit suspended only by the fruit clamps of the fruit carriage. Thereafter and while the bar 389 is maintained in the counter-clockwise direction to hold the clamping members in contact with the fruit, a clockwise movement is imparted to the lever arm 312 by the driving mechanism heretofore described in connection with the bobbing device and to propel the splitting carriage 392 backwardly into the machine.

While the arms 386 and 390 and the bar 389 are rotated in a counter-clockwise direction to impinge the clamping members against the fruit, the shoe 406 is slid along the bar 389 by the lever 312 concurrently with the moving of the fruit transfer or splitting carriage.

Springs 408 provide a flexible means for engaging the fruit clamps with the fruit. When the fruit clamp members are brought in contact with a fruit to be carried thereby and by displacement of the slider bar 389 in a counter-clockwise direction about the rod 355, such contact is had by pressing the springs 408 against the brackets 402 about the apertures 404 to pivot the collars 398 and 413. After the clamping members have been stopped by the fruit there may be a further displacement of one of the jaws 401 due to movement of upper part of lug 402 toward bar 389 against tension of spring 408 concurrently to further projecting the rods 405 through the apertures 404. Greater compression of the springs 408 provides for a tighter gripping of the fruit but does not force the clamping members into the fruit.

When the fruit which is being carried inwardly of the machine reaches the edge 437 of the blade 436 which coincides with the central axis of the fruit, the two leaf members 432 are together. As the carriage 392 continues to move inwardly of the machine the scoop-like jaws 401 and 417 at the following end of the fruit prevent it from slipping from the clamping members as it is forced past the blade. Thus the fruit is halved centrally and longitudinally with a half on either side of the leaf-like members 432. The fins 435 prevent the fruit from sliding downwardly when subsequently the clamping members are spread by the lowering of the roller 382 along the camming surface 370.

Concurrently with or shortly after the spreading of the clamping members, the rod 367 is lowered by the camming surface 377 passing beneath the roller 439. Lowering of the rod 367 forces the racks 441 and 443 downwardly to rotate the pinions 430 in opposite directions and to thereby spread the leaf-like members 432. The outer faces of the leaf-like members 432 are designed with the points 434 so that the fruit cannot flatly engage the members to create a vacuum between the fruit and members, and so that the fruit will easily fall from the members when they are spread to be disposed in a common horizontal plane. When so spread the leaf-like members 432 are at such a space interval that each of them will be above one of a pair of fruit cups 460 which are stationed between the upright members 50 and 53. A fruit turret serves as a base for four pairs of fruit cups. The fruit sections upon the leaf-like members are thus deposited in the fruit cups 460.

After the splitting carriage has carried a fruit past the splitting knife and has released the fruit, it is then carried forwardly by the lever 312 to engage a succeeding fruit which has been carried to the station D of the feed turret in the same manner as hereinabove described.

The main fruit turret is shown clearly in Figs. 1 and 3 as including a plurality of pairs of fruit cups 460 adapted to be intermittently rotated by the turret and positioned with their longitudinal axes parallel with and on opposite sides of a projection passing through the central axis of the shaft 174 and centrally of station D, such line projecting centrally between the parallel fruit cups and passing through the central axis of the main fruit turret, so that in fruit spreading position each spreading wing will deposit a half fruit in one of the cups which, as shown in Fig. 3 at 460, are positioned immediately under and on each side of the spreader mechanism. Thus as each spreader wing shifts to substantially horizontal position, the two halves of the fruit on each side of the spreader mechanism will be deposited in corresponding cups of the turret mechanism, and thence when the spreading mechanism resumes its vertical position the turret will move with intermittent motion, carrying the half fruits thus deposited in the two cups to an operating station, at the same time bringing two empty cups beneath the spreader mechanism.

Claims to the fruit turret cups and other operations performed upon the half fruit after being deposited in the cups form the subject matter of other applications filed by me and are not herein specifically claimed.

Having thus described my invention, what I claim as new and desire to secure by Letters Patent is:

1. In a fruit treating machine, the combination of a main turret carrying a plurality of spaced apart fruit holders thereon adapted intermittently to move in a horizontal plane, fruit transporting means adapted to grasp fruit sections and to convey the same along a path intersecting the axis of rotation of said turret, fruit severing and spreading means disposed in the path of movement of said transporting means for severing a fruit into half sections, said spreading means including a plurality of wings, means for angularly shifting said wings from a vertically juxtaposed position to a horizontally extending open position whereby in said juxtaposed position a fruit section is deposited upon the outer face of each spreader, means for oscillating said spreader approximately one hundred eighty degrees whereby to deposit a fruit section in each fruit holding means on the turret, means for intermittently actuating said turret, said transporting means and said fruit spreading means in synchronism, and means mounted on said spreader means for maintaining said fruit section on said spreader means during the shifting of said spreader means from vertical to substantially horizontal position.

2. In an automatic machine for cutting half fruit, the combination of means forming a frame for the machine, a centrally disposed shaft, means for rotating said shaft, a stationary sleeve surrounding said shaft and provided with spaced supports, a plurality of spreaders shiftably mounted on one of said supports, fruit cutting means mounted in advance of said spreaders and adapted to be aligned with said spreaders when said spreaders are in closed position, a track mechanism mounted on another of said supports, means supporting the opposite end of said track members, carriage means reciprocal along said track, fruit gripping jaws carried by said carriage means, and a plurality of cams mounted above said stationary sleeve and rotated by means of said first mentioned shaft, one of said cams having an actuating connection to the spreader operating mechanism and another of said cams having an actuating connection for operating said fruit gripping jaws.

3. In an automatic machine for halving whole fruit, the combination of a main standard, an auxiliary standard carried thereby, a main drive shaft, a sleeve stationarily surrounding said main drive shaft provided with a plurality of supports, a plurality of cams rotated by said main shaft and disposed about said stationary sleeve, each of said cams having a track therein, a roller in each track, a vertically shiftable bar connected to each roller, the bars being shiftable in a direction parallel to the axis of said main shaft, a track mechanism disposed at right angles to said main shaft and supported by one of said supports and said auxiliary standard, a carriage mechanism slidable along said track, shiftable fruit gripping arms mounted on said carriage mechanism, an actuating bar disposed parallel to said carriage mechanism and having connections to said fruit gripping arms for actuating the same, an operative connection between one of said vertically reciprocating bars and said actuating bar, a pair of fruit spreaders pivotally mounted upon another one of said supports and shiftable substantially from a vertical position to a position such that each spreader lies at opposed angles to said vertical position, an operative connection from the other of said vertically reciprocating bars to said fruit spreaders to operate the same, and means disposed in advance of the fruit spreaders and in the path of movement of the fruit gripping jaws for severing the whole fruit into halves prior to the conveyance of said fruit by said gripping jaws onto said spreaders.

4. In an automatic fruit machine, the combination of a standard providing a vertical shaft, power means for operating said shaft, the upper portion of said shaft having fixed thereto a pair of cams, one disposed above the other, a sleeve surrounding said shaft and disposed below said cams, support means carried by said sleeve, a track mechanism extending at right angles to said sleeve and carried by said frame and by one of said support means, a carriage reciprocal along said track, gripping jaws mounted on said carriage and pivotal at right angles to the line of movement of said carriage, operating means extending parallel to said track and adapted to actuate the gripping jaws in any position thereof along said track, a pair of spreaders mounted on another one of the support means of the sleeve, actuating shafts mounted on said last named support means, each of said shafts being connected to a spreader for oscillating said spreaders from a vertical position to opposed, angularly disposed positions, said spreaders in said vertical position being in line with the path of movement of said gripping jaws, a bar vertically disposed and parallel to said stationary sleeve, a pair of spaced racks carried by the lower portion of said bar, each rack having teeth meshing with a pinion fixed upon each of said spreaders, shafts for mutually actuating the spreader shafts upon reciprocation of said bar, the upper end of said bar having an operating connection with one of said cams, and an actuating connection with the other of said cams connecting to that bar which actuates the gripping jaws, and means disposed in advance of the spreaders for severing a whole fruit, said means being in the path of movement of the gripping jaws.

5. In a device of the class described, the combination of means for transporting a whole fruit along a predetermined path, a pair of relatively movable surfaces disposed in said path of movement, means for shifting said surfaces from a juxtaposed position to a spread apart position, one of said surfaces extending forwardly of the other and forming a cutting edge, means for actuating the fruit transporting means whereby to carry a whole fruit across said cutting edge whereby to sever the whole fruit into sections and to deposit each section onto the opposed surfaces, and means for oscillating said opposed surfaces for spreading said cut sections of fruit.

6. A combined spreader and severing means for a fruit treating machine, comprising a relatively flat, narrow spreading member having a forwardly extending wedge-shaped cutting edge, one side wall of said member being countersunk, a second relatively flat, thin member adapted in one position to lie in said countersunk seat to form a symmetrically faced spreading member, and means for pivotally mounting said sections whereby they may swing from a closed, juxtaposed position to an open position.

7. A spreading device for fruit treating apparatus, comprising a pair of oppositely shiftable, relatively thin, flat spreader members having their opposed faces formed with a plurality of angularly disposed facets whereby to provide portions in relief to prevent undue adhesion of the cut faces of the fruit sections thereto and means for shifting said sections from a closed juxtaposed position to a spaced apart open position.

8. A spreader mechanism comprising oppositely shiftable, relatively flat, thin plates adapted to lie back to back, the outer faces of said plates being formed with a plurality of facets disposed angularly one with respect to another, one of said facets of each plate having an outstanding fin and means to shift said plates oppositely.

9. Fruit spreading mechanism comprising a pair of oppositely shiftable blades of greater length than height adapted to be disposed in one position back to back, the outer faces of said blades being provided with a plurality of facets converging to a common point on said outer faces, there being a fin extending longitudinally of each face, the line of projection of said fin extending substantially through the converging point of said facets and means to shift said blades oppositely.

10. A combined spreader and splitting mechanism comprising a relatively long, relatively thin plate having a forward projection formed wedge-shaped, with its front edge formed as a cutting edge, the lower portion of said cutting edge extending downwardly below the lower edge of said plate, the other face of said plate providing a countersunk seat disposed to the rear of said cutting edge, and a second plate of a shape normally to rest in said countersunk seat, the outer face of said second plate being symmetrically shaped with respect to the outer face of said first mentioned plate.

11. A combined spreader and splitting mechanism comprising a relatively long, relatively thin plate having a forward projection formed wedge-shaped, with its front edge formed as a cutting edge, the lower portion of said cutting edge extending downwardly below the lower edge of said plate, the other face of said plate providing a countersunk seat disposed to the rear of said cutting edge, and a second plate of a shape normally to rest in said countersunk seat, the outer face of said second plate being symmetrically shaped with respect to the outer face of said first mentioned plate, the outer face of each of said plates having a laterally extending fin, said fin being disposed to the rear of the forward edge of said countersunk seat.

12. In a fruit treating device, the combination of a pair of spreader plates adapted to be positioned in back to back, juxtaposed position in the path of movement of fruit sections to receive a fruit section on the outer face of each spreader plate, an actuating shaft for each spreader plate, a gear sector on each shaft, a pair of spaced racks, each rack having teeth engaging a sector, a reciprocable bar interconnected to each rack, and power means for reciprocating said bar whereby simultaneously to oscillate each spreader plate upon the reciprocation of said bar.

13. In a device of the class described, the combination of a shaft, a sleeve thereon, supporting means on said sleeve, a pair of spreader plates each having a shaft, means for oscillatably mounting each shaft upon said supporting means, said supporting means providing a plurality of slideways, spaced bars in said slideways, each of said bars having rack teeth thereon, a gear sector on the shaft of each spreader and each adapted to engage the teeth of one of said rack bars, and operating means extending parallel with said shaft, said means for said rack bars comprising a cam roller, the upper end of said shaft having a cam thereon, said cam being constructed and arranged to actuate said roller whereby to actuate said rack bars and gear sectors to oscillate said spreaders.

14. In a device of the class described, the combination of a main shaft, a relatively long sleeve thereon, said sleeve forming an outstanding support, a pair of spreader blades each having a shaft mounted on said support, said sleeve support providing a slideway, a bar slidable vertically in said slideway and operatively connected to the shafts of the spreader blades for simultaneously actuating the same, a circular cam on said main shaft and having a cam groove thereon, and a cam roller on the upper end of said bar and disposed, in said cam groove, whereby upon the rotation of said main shaft said bar will be reciprocated to oscillate said spreaders.

15. In a device of the class described, the combination of a shaft, a relatively long sleeve surrounding said shaft, said sleeve having in a portion forming an outstanding support, a combined spreader and splitting mechanism carried by said support and comprising a pair of relatively flat plates, one having a countersunk seat to receive the other, the plate with the countersunk seat therein extending forwardly of the other plate and being provided with a knife edge, and means operated by the rotation of said shaft for intermittently oscillating said plates.

16. In a device of the class described, the combination of a supporting frame, means providing a guideway on said frame, a fruit transfer carriage adapted to move along said guideway, means for reciprocating said carriage therealong, fruit jaws mounted on said carriage and adapted to shift relatively in a direction angularly disposed with respect to the direction of movement of said carriage, relatively elongated oscillatable means extending laterally of and along the path of movement of said carriage, means associated with at least one of said jaws and lying in the path of movement of said oscillatable means for shifting said jaws relatively upon oscillation of said oscillatable means, a shaft disposed at one end of said guideway, a sleeve on said shaft, a cam on said shaft, a support on said sleeve, a bar reciprocably mounted in said support, said bar carrying a cam roller adapted to be operated by the rotation of said cam, said bar having a pivotally mounted block thereon, and means connecting said block to said oscillatable means, said means comprising a clevis adapted to receive said block, and having an arm connected to said oscillatble means for actuating the latter.

17. In a device of the class described, the combination of a support frame, a vertical shaft thereon, an elongated sleeve on said shaft, a cam disposed on said shaft above said sleeve, said cam having a raceway therein, a pair of spaced bearings on said sleeve, a pair of guide rods mounted in said bearings, a carriage slidable along said guide rods, fruit transporting jaws mounted on said carriage and adapted to be relatively shiftable in a direction angularly disposed with respect to the line of movement of said carriage, means for reciprocating said carriage along said guide rods, an elongated member disposed parallel to and adjacent one of said guide rods, a crank mounted on the said last mentioned guide rod and having an arm connected to said elongated member, said crank having a laterally extending clevis, a block in said clevis, means operatively connected to said cam for reciprocating said block whereby to oscillate said elongated member thereby relatively to shift said jaws on said carriage.

18. In a device of the class described, the combination of a supporting frame, a pair of guides extending laterally and in parallel relation from said frame, a carriage slidable along said guides, fruit holding means shiftably mounted on said carriage for relative opening and closing movement with respect to a fruit to be transported, said fruit holding means having an actuatable member, one of said guides being oscillatable, means for oscillating said guide, and means actuated by the oscillation of said guide for actuating said actuatable member in a plurality of positions of the carriage.

19. In a device of the class described, the combination of a supporting frame, a plurality of parallel guides extending laterally thereof, a carriage slidable along said guides, one of said guides being turnable, means for oscillating said turnable guide, an oscillatable member extending parallel to said oscillatable guide and in proximity to the path of movement of said slidable carriage, fruit holding means mounted on said carriage, including relatively shiftable fruit engaging members, at least one of said last mentioned members having an actuatable member adapted to contact said oscillatable member, and means interconnecting said oscillatable guide and said oscillatable member whereby upon the oscillation of said oscillatable guide said oscillatable member will be shifted to shift said fruit engaging members relatively and in a plurality of shifted positions of said carriage.

20. In a device of the class described, the combination of a supporting frame, a plurality of guides extending in parallel relation therefrom, a carriage comprising a pair of sleeves, one on each of said guides, end caps rigidly interconnecting said sleeves, a pair of sleeves mounted on each sleeve between said end caps, each of said second pair of sleeves having a depending fruit holding member and having a laterally extending gear sector adapted to mesh with the teeth of the corresponding gear sector on the other sleeve, each fruit holding member having an upstanding bracket thereon provided with a vertically extending elongated slot, an elongated bar extending parallel to and adjacent one of said guides, means for oscillating said adjacent guide, means interconnecting said oscillatable guide and said parallel bar whereby to oscillate said parallel bar, an elongated member having a seat adapted to slide along said elongated bar, said seat having an outstanding pin passing through the slot in said bracket, and a coiled spring disposed between said seat and said bracket.

21. In a device of the class described, the combination of a supporting frame, a pair of laterally extending parallel guides, an elongated sleeve on each guide, means rigidly interconnecting said sleeves, a pair of relatively shorter sleeves on each longer sleeve, each of said shorter sleeves having a toothed sector the teeth of which mesh with the teeth on the opposed toothed sector, each of said shorter sleeves having a depending fruit holding arm and an upstanding bracket the upper end of which is provided with an elongated slot, a bar extending adjacent and parallel to one of said guides, said one of said guides being oscillatable, means interconnecting said oscillatable guide with said bar whereby to oscillate said bar, a presser foot slidable along said bar and having a plurality of outstanding spaced apart pins, each pin passing through the elongated slot of a bracket, and a coiled spring between said presser foot and the inner wall of said bracket.

22. In a device of the class described, the combination of a supporting frame, a pair of parallel guides extending laterally therefrom, a carriage adapted to slide along said guides, said carriage including two pairs of sleeves, each pair of opposed sleeves having intermeshing teeth, corresponding sleeves on one of said guides each having an upstanding extension, a roller on said extension, each sleeve having a depending fruit holding arm, an elongated actuating bar extending parallel to one of said guides, means for oscillating the guide adjacent said bar, interconnections between said oscillatable guide and said bar for oscillating the bar, each of said sleeves which carries a roller having an arm, a slide member on said bar, and a resilient connection between said slide member and each of said arms.

23. A fruit treating machine comprising a splitting and spreading device, including paired wings disposed in parallel juxtaposition and movable relatively away from one another into a spread position, a knife carried by one of said wings and having opposed fruit severing faces forming co-planar extensions of opposed faces of said wings, means for advancing a fruit against said knife to divide such fruit longitudinally and for advancing the divided fruit sections onto opposed faces of said wings, the external surface of each wing having relatively raised and relieved fruit contacting portions and a fin projecting outwardly of the surface thereof, adapted to engage the body of a fruit section advanced thereonto, said fins extending longitudinally of the path of movement of the fruit onto the wings and precluding movement of the fruit sections laterally of said wings, and means for moving said wings from said juxtaposition away from one another into spread position to spread the fruit sections.

24. The combination of cutting means having opposed faces, opposed fruit contacting surfaces extending rearwardly of said faces formed by said cutting means and against which contacting surfaces the half portions of the fruit are temporarily held after severing, at least one of said surfaces being formed integrally with said cutting means, means for conveying a whole fruit across the opposed fruit cutting means, and including means for holding each severed fruit section in contact with said fruit contacting surfaces and fruit penetrating means projecting from each of said fruit contacting surfaces in the path of movement of the fruit sections and adapted to enter the cut surfaces of the fruit sections for temporarily holding said fruit sections against shifting relative to said fruit contacting surfaces.

25. The combination of relatively movable juxtaposed members, severing means carried by at least one of said members and providing opposed fruit severing surfaces, said members having fruit contacting faces forming co-planar extensions of said severing surfaces and against which faces the sections of the fruit are temporarily held after severing, means for carrying fruit bodily across the severing surfaces and onto the fruit contacting faces of said members, fruit piercing means projecting from opposed faces of said relatively movable members and adapted to pierce the cut surfaces of the severed fruit sections for temporarily holding the fruit sections from shifting relative to said members, and means for shifting said members relatively away from one another to spread the severed fruit sections.

26. The combination of relatively movable juxtaposed members, severing means carried by at least one of said members and providing opposed fruit severing surfaces, said members having fruit contacting faces forming co-planar extensions of said severing surfaces and against which faces the sections of the fruit are temporarily held after severing, means for carrying the fruit bodily across the severing surfaces and onto the fruit contacting faces of said members, the opposed faces of said members being relatively raised and relieved to prevent the creation of a vacuum between said faces and the fruit sections, and means for shifting said members relatively away from one another to spread the severed fruit sections.

27. In a feeding mechanism, a receptacle for a fruit, a track, a carriage movably mounted on said track and comprising clamping members, means for actuating said clamping members including an implement extending in parallelism to said track and movable laterally thereof, means for imparting lateral movement to said implement, and means for propelling said carriage along said track, a lateral movement of said implement effecting the same relative displacement of said clamping members regardless of the position of the carriage along said track and maintaining such relative position while the carriage is being displaced along the track, said implement being moved to close said clamping members incident to registry thereof with said receptacle and anteriorly to an operation of said propelling means, and said implement being actuated to spread such clamping members subsequently to the operation of said propelling means.

28. A feeding mechanism comprising a track, a carriage mounted for movement along said track and comprising clamping members for engaging a fruit, means operatively engaging said clamping members for the closing and spreading thereof and having a part extending longitudinally of said track, means for displacing said part transversely of said track to move said clamping members, and means for propelling said carriage along said track, the closed or open position of said clamping members being in accordance with the direction of displacement of said longitudinal part irrespective of the position of said carriage upon said track.

29. A pear treating apparatus comprising a carriage for conveying a fruit, a fruit splitting device comprising complemental members providing a cutting edge and having faces receding cuneiformly from said edge, there being a raised section on each of said faces, and means of pivoting said members about adjacent edges, the cutting edge of said splitting device bisecting a fruit conducted therepast in said carriage, and the raised section of said splitting device preventing the creation of a vacuum between said faces and the split fruit.

30. In a fruit treating apparatus, a loading mechanism comprising a linear track, a carriage reciprocable on said track and comprising jaws movable transversely of the track for receiving and for discharging fruit, a member coextensive with and parallel to said track and in constant engagement with said carriage for determining the position of said jaws, and means for reciprocating said carriage and for moving said member relatively to said track.

31. In a fruit treating device, the combination of fruit holding means, a feeding mechanism associated with said holding means comprising paired rails, opposed clamp members mounted upon said rails for carrying a fruit operating means mounted on one of said clamping members for moving said clamping members along said rails toward and away from the fruit holding means, and connecting means between said clamping members whereby the second clamp member is moved coincidentally to movement of the first named member.

32. A fruit handling device, comprising a track of paired rails, a jaw on each rail, said jaws being connected one to another for complemental opposed movement, means in registry with one of said jaws for opening and closing said jaws, and a resilient connecting member between said opening and closing means and said jaw.

33. A fruit handling device, comprising opposed jaws, a rail for each of said jaws, a linear guide member parallel to said rails to open and close said jaws, and a resiliently mounted member on said jaws and engaging said guide member to compensate for differences in the size of fruit carried between said jaws.

34. In combination, parallel rails, opposed jaws on said rails, a knife between said rails and between said jaws, connecting means between said jaws for maintaining uniform complemental opposed movement therebetween, a jaw opening and closing member engaging one of said jaws, and means between said jaws and said opening and closing member for compensating for a difference in the size of fruit held between said jaws.

35. The combination with a fruit treating apparatus for operation on halved fruit, and a feeding device for receiving a whole fruit, of a carrier intermediate said feeding device and said apparatus comprising segmental jaws movable toward one another to grip a whole fruit therebetween and separable to release the halves thereof, paired track members, one for each jaw, a knife bisecting said carrier in the path of said carrier between said feeding device and said apparatus, means for propelling said carrier along said track, means for moving said segmental jaws toward one another when in registry with said feeding device, means for compensating for the difference in the size of fruit operable coincidentally with the closing of said jaws, and means for spreading said segments when said segments have passed said knife.

36. A fruit feeding device comprising parallel tracks, opposed jaws on said tracks for holding a fruit and movable along said tracks and also toward and away from one another, means for moving said jaws along said tracks in unison, a linear jaw opening member coextensive with and parallel to said tracks and engaging said jaws to determine their position relative to one another, and means for moving said jaw opening member relatively to said tracks to open and close said jaws.

37. In a fruit dividing device, a carriage for fruit, paired separable blades for dividing the fruit and for separating the parts thereof, and means for moving said carriage from one side of said blades to a position across said blades, each of said blades having a raised section parallel to and in the path of said carriage and said raised section preventing the cut surfaces of the fruit from adhering to said blade.

38. A fruit treating apparatus comprising a halving means, means associated therewith and provided with extended opposed surfaces which are relatively flat, means for gripping and moving a whole fruit to bring its stem axis into contact with and across the halving means to divide the fruit into halves along its stem axis, each half fruit thereafter lying with its flat face in contact with the flat face of the opposed surfaces and held by one of said gripping members, each of said opposed surfaces having a raised section for preventing the creation of a vacuum between its face and the face of the split fruit.

39. In a device of the class described, the combination of means for transporting a whole fruit along a predetermined path, a shiftable fruit severing member disposed in the path of movement of said fruit, a second member shiftable oppositely to said severing member and cooperating with said severing member to spread the severed fruit, means for actuating the transporting means to carry the whole fruit across the forward edge of said severing member to sever the fruit into sections and to deposit a section on each of said members, means for oppositely shifting said members to spread the fruit sections, and a plurality of fruit receiving means operatively associated with said members to receive therefrom the severed fruit sections.

40. In a device in the class described, the combination of a supporting frame, a pair of guides carried by and extending in parallel relation from said frame, fruit holding members shiftably maintained on said guides for simultaneously sliding movement therealong and for relative movement toward and from each other into open and closed position, an elongated member extending parallel to said guides from one and to the other of said guides, means supporting said elongated member for oscillation about the axis of one of said guides, operative connections between said elongated member and said fruit holding members for shifting said members relatively to opened and closed positions upon oscillation of said elongated member.

41. In a device of the class described, the combination of a supporting frame, a plurality of guides carried by said frame and extending in parallel relation therefrom, a carriage comprising a pair of sleeves, one on each of said guides, each of said sleeves having a depending fruit holding member and having a laterally extending gear sector adapted to mesh with the teeth of a corresponding gear sector on the other sleeve, one of said fruit holding members having an up-standing bracket thereon, and elongated bar extending parallel to and adjacent one of said guides, means for oscillating said elongated bar, a member slidable along said elongated bar, pin and slot connections between said bracket and said slide member, and a coiled spring operatively connected between said slide member and said bracket.

42. The combination of relatively movable juxtaposed members, fruit severing means disposed in front of said members, said members having fruit contacting faces forming coplanar extensions of the lateral faces of said severing means and against which faces the sections of the fruit are temporarily held after severing, means for carrying the fruit bodily across the severing surfaces and onto the fruit contacting faces of said members, the opposed faces of said members being relatively raised and relieved to prevent the creation of a vacuum between said faces and the fruit sections, and means for shifting said members relatively away from one another to spread the severed fruit sections.

43. A pear splitting apparatus comprising paired receptacles, in combination with a fruit splitting blade, and a device comprising paired wings disposed above said receptacles for movement from parallel vertical plane to a horizontal position over said receptacles, said fruit splitting blade being in the same vertical plane and to the front of said wings, means for moving a fruit past said blade for the division of said fruit into sections and for advancing such sections upon opposite sides of said wings, there being sections of predetermined area in relief upon each of said wings for engaging the flat faces of the fruit sections, means precluding accidental lateral movement of the sections of half fruit on said wings comprising fins projecting normally from said wings and into the body of such fruit sections, and means for moving said wings from a vertical position to a horizontal position.

44. A fruit splitting device comprising paired wings disposed in parallel vertical planes and movable away from one another to an aligned horizontal plane, a knife having a cutting edge in a plane between the vertical planes of said wings and parallel thereto, means for advancing a fruit against said knife to divide such fruit longitudinally, such fruit being advanced with the divided fruit sections upon opposite faces of said wings, each of said wings having flat raised areas for contacting the flat faces of such fruit and a fin projecting outwardly thereof into the body of the fruit sections, said fins being arranged longitudinally of the direction of movement of such fruit and precluding movement of such sections laterally of said wings, and means for moving said wings from a vertical position to a horizontal position.

45. Fruit splitting apparatus comprising fruit severing means including means providing opposed relatively plane surfaces disposed in the plane of the opposed surfaces of the fruit severing means and against which the cut sections of the fruit are adapted to lie after the cutting operation, means for conveying the whole fruit into contact with the cutting means to sever the fruit and to convey the severed portions onto the plane surfaces, and fruit piercing means disposed on each of said plane surfaces in the path of movement of the fruit and of sufficient projection to be forced into the body of the fruit whereby the fruit is impaled thereon and temporarily held.

46. Fruit splitting apparatus comprising fruit severing means including means providing opposed surfaces disposed in the plane of the opposed surfaces of the fruit severing means and against which the cut sections of the fruit are adapted to lie after the cutting operation, means for conveying a whole fruit into contact with the cutting means to sever the fruit and to convey the severed portions onto the plane surfaces, and means formed on said opposed surfaces for preventing the formation of a vacuum between said opposed surfaces and the cut face of the fruit, and fruit piercing means projecting outwardly from each of said opposed surfaces to enter the cut face of the fruit whereby to prevent movement of the fruit laterally of the opposed surfaces.

47. In a fruit-treating apparatus, the combination of a frame, fruit-conveying means adapted to travel along a horizontal pathway at a predetermined level, from a fruit-feeding station to a spreader station, fruit-severing means disposed in the path of the conveying means for severing the fruit into sections, fruit-spreading means comprising opposed extended surfaces shiftable to one position to lie substantially vertically in the path of said conveying means to receive the severed sections thereon, movable fruit-holding means adapted to be moved into position adjacent the fruit-spreading means for receiving the fruit sections from said spreading means, and means carried by each spreading means adapted to contact with each fruit section as each fruit section is moved onto said spreading means for preventing each fruit section from shifting downwardly while said spreaders are in vertical position.

48. A fruit-splitting apparatus comprising fruit-severing means, means providing opposed surfaces disposed in alignment with the fruit-severing means and against which the cut sections of the fruit are adapted to lie in substantially vertical position after the cutting operation, means for conveying the whole fruit into contact with the cutting means to sever the fruit and to convey the severed portions with the cut faces of the severed portions lying in substantially vertical planes onto said opposed surfaces, and fruit-piercing means disposed in a common horizontal plane on each of said opposed surfaces and lying in the path of movement of the severed sections as they are conveyed by said conveying means onto said opposed surfaces for piercing the body of the fruit sections whereby to hold the severed sections on the opposed surfaces and preventing the severed sections from slipping downwardly on said opposed surfaces.

MARK EWALD.